(12) United States Patent
Saito

(10) Patent No.: US 12,277,293 B2
(45) Date of Patent: Apr. 15, 2025

(54) VEHICULAR DISPLAY DEVICE

(71) Applicant: Nippon Seiki Co., Ltd., Niigata (JP)

(72) Inventor: Ryuji Saito, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 18/711,713

(22) PCT Filed: Nov. 24, 2022

(86) PCT No.: PCT/JP2022/043315
§ 371 (c)(1),
(2) Date: May 20, 2024

(87) PCT Pub. No.: WO2023/095823
PCT Pub. Date: Jun. 1, 2023

(65) Prior Publication Data
US 2025/0021192 A1    Jan. 16, 2025

(30) Foreign Application Priority Data
Nov. 25, 2021   (JP) ................. 2021-191408

(51) Int. Cl.
*G06F 3/041* (2006.01)
*G06F 3/04886* (2022.01)

(52) U.S. Cl.
CPC ...... *G06F 3/04186* (2019.05); *G06F 3/04886* (2013.01)

(58) Field of Classification Search
CPC .. G06F 3/04186; G06F 3/04886; G06F 3/041; G06F 3/0488; B60R 16/02; B60W 30/06
See application file for complete search history.

(56) References Cited

U.S. PATENT DOCUMENTS

| 8,330,730 B1 * | 12/2012 | Kurtz | .............. | G06F 3/0421 |
| | | | | 345/173 |
| 2011/0157090 A1 * | 6/2011 | Parihar | ............ | G06F 3/04886 |
| | | | | 715/773 |

(Continued)

FOREIGN PATENT DOCUMENTS

| JP | 2010-257230 A | 11/2010 |
| JP | 2017-107515 A | 6/2017 |

(Continued)

OTHER PUBLICATIONS

International Search Report received in PCT Application No. PCT/JP2022/043315, dated Feb. 14, 2023, w/ English Translation.

*Primary Examiner* — Antonio Xavier
(74) *Attorney, Agent, or Firm* — Rimon P.C.

(57) ABSTRACT

Provided is a vehicular display device that suppresses malfunctioning of a vehicle due to malfunctioning of a touch panel module. This vehicular display device comprises a touch panel module and a control unit, wherein the touch panel module comprises a storage unit for storing calibration data, which is an adjustment parameter for touch coordinate detection, and the control unit comprises a ROM for storing correct calibration data, and a failsafe control means for detecting a malfunction of the touch panel module. After startup of the control unit and before an automatic parking layout screen, which includes an automatic parking execution operation button, which is the malfunction detection subject of the failsafe control means, is displayed on the touch panel module, the failsafe control means executes a first confirmation process for confirming that the calibration data stored in the storage unit is correct.

4 Claims, 4 Drawing Sheets

(56) References Cited

U.S. PATENT DOCUMENTS

2014/0354585 A1* 12/2014 Cok .................... G06F 3/04186
 345/174
2017/0153812 A1* 6/2017 Creager ................ G06F 3/0304
2019/0004633 A1 1/2019 Uchida et al.

FOREIGN PATENT DOCUMENTS

| JP | 2018-136728 A | 8/2018 |
| JP | 2019-175035 A | 10/2019 |
| WO | 2017/158907 A1 | 9/2017 |
| WO | 2020/013159 A1 | 1/2020 |

\* cited by examiner

VEHICULAR DISPLAY DEVICE

CROSS-REFERENCE TO RELATED APPLICATIONS

This application is the U.S. National Phase under 35 U.S.C. § 371 of International Application No. PCT/JP2022/043315, filed on Nov. 24, 2022, which claims the benefit of foreign priority to Japanese Patent Application No. 2021-191408 filed on Nov. 25, 2021, the entire contents of each of which are hereby incorporated by reference.

TECHNICAL FIELD

The present disclosure relates to a vehicular display device.

BACKGROUND ART

Patent Document 1 discloses a vehicular display device including a touch panel module that displays operation buttons.

PRIOR ART DOCUMENT

Patent Document

Patent Document 1: WO2020/013159

SUMMARY OF THE INVENTION

Problems to be Solved by the Invention

However, Patent Document 1 leaves room for improvement in terms of functional safety when vehicle-mounted functions are executed using the operation buttons displayed on the touch panel module.

Thus, an object of the present disclosure is to provide a vehicular display device that can prevent a vehicle malfunction caused by a malfunction of a touch panel module.

Solution to Problem

In one aspect, the present disclosure provides solutions as follows.

(1) A vehicular display device includes: a touch panel module that detects a touch coordinate on a display screen; and a control unit that causes the touch panel module to switch and display a plurality of layout screens including operation buttons and causes the touch coordinate to be inputted from the touch panel module. The touch panel module includes a first storage unit that stores calibration data, which is an adjustment parameter for detecting the touch coordinate. The control unit includes a second storage unit that stores the correct calibration data, and a fail-safe control means that detects a malfunction of the touch panel module. The layout screen includes a first layout screen that does not include a fail-safe control target operation button, which is a malfunction detection target of the fail-safe control means, and a second layout screen that includes the fail-safe control target operation button. After the control unit is activated and before the second layout screen is displayed on the touch panel module, the fail-safe control means compares the calibration data stored in the first storage unit and the calibration data stored in the second storage unit, thereby executing a first confirmation process to confirm whether the calibration data stored in the first storage unit is correct.

(2) In the configuration of the above (1), the fail-safe control target operation button is an operation button for executing a vehicle automatic control mode.

(3) In the configuration of the above (1) or (2), if the fail-safe control means determines that the calibration data stored in the first storage unit is incorrect, the fail-safe control means rewrites the calibration data stored in the first storage unit to the correct calibration data.

(4) In any of the configurations of the above (1) to (3), after conditions for switching from the first layout screen to the second layout screen are satisfied and before the touch panel module completes displaying the second layout screen, if the fail-safe control means detects a touch operation in an operation detection range of the fail-safe control target operation button, the fail-safe control means determines that an erroneous operation of the fail-safe control target operation button occurs.

(5) In any of the configurations of the above (1) to (4), the fail-safe control means executes a second confirmation process to confirm whether the fail-safe control target operation button is displayed correctly when the second layout screen is displayed on the touch panel module.

Effect of the Invention

According to the present disclosure, it is possible to provide the vehicular display device that can prevent a vehicle malfunction due to a malfunction of the touch panel module.

MODE FOR CARRYING OUT THE INVENTION

Hereinafter, each example is described in detail with reference to the accompanying drawings.

Figure 1:
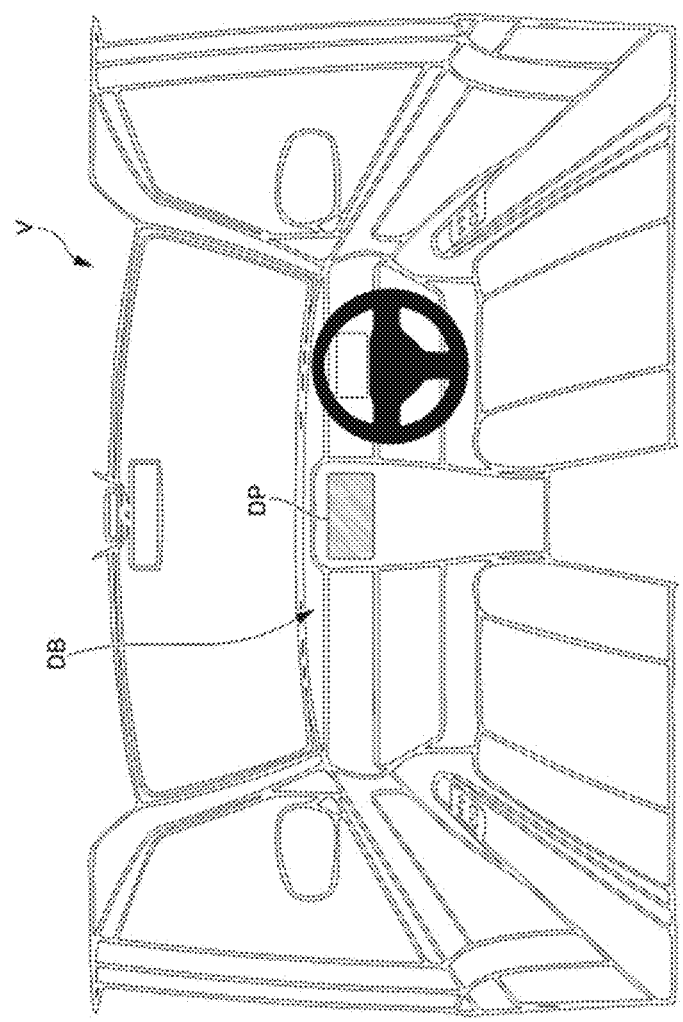
FIG. 1 is an internal perspective view of a vehicle including a vehicular display device of the present embodiment.

As illustrated in FIG. 1, a vehicular display device DP of the present embodiment is a multi-information display that is mounted on a left/right center part of a dashboard DB of a vehicle V and is capable of displaying various pieces of information and operating various functions.

Figure 2A:
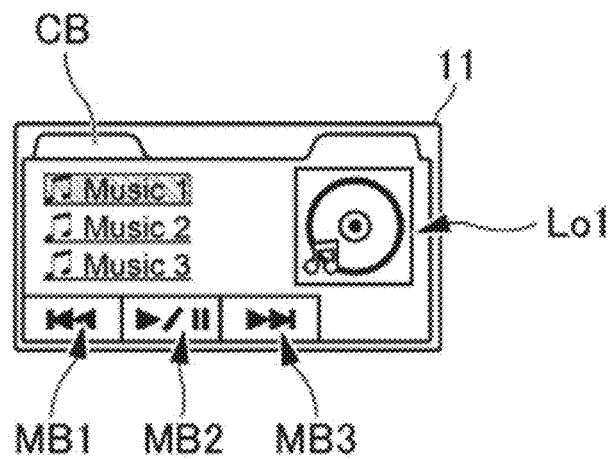
FIGS. 2A-2C are diagrams illustrating a display screen of the vehicular display device, 2A is a diagram of a music playback layout screen (first layout screen) including music playback operation buttons, 2B is a diagram of a layout screen (second layout screen) including an automatic parking execution operation button (fail-safe control target operation button), and 2C is a diagram illustrating the display screen when a malfunction is detected.

For example, as shown in FIG. 2A, the vehicular display device DP displays a music playback layout screen Lo1 (first layout screen) that includes an operating state of a music playback function and music playback operation buttons MB1 to MB3. A passenger of the vehicle V can operate the music playback function by performing a touch operation to the music playback operation buttons MB1 to MB3 displayed on the vehicular display device DP.

Figure 2B:
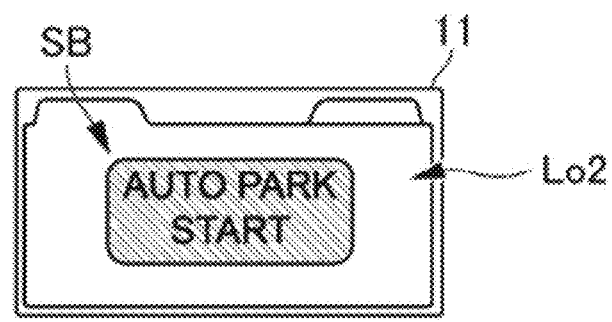

Further, as shown in FIG. 2B, the vehicular display device DP displays an automatic parking layout screen Lo2 (second layout screen) including an operating state of an automatic parking function (one of automatic control modes) of the vehicle V and an automatic parking execution operation button SB (fail-safe control target operation button). The passenger of the vehicle V can operate the automatic parking function of the vehicle V by performing a touch operation to the automatic parking execution operation button SB displayed on the vehicular display device DP.

Figure 3:
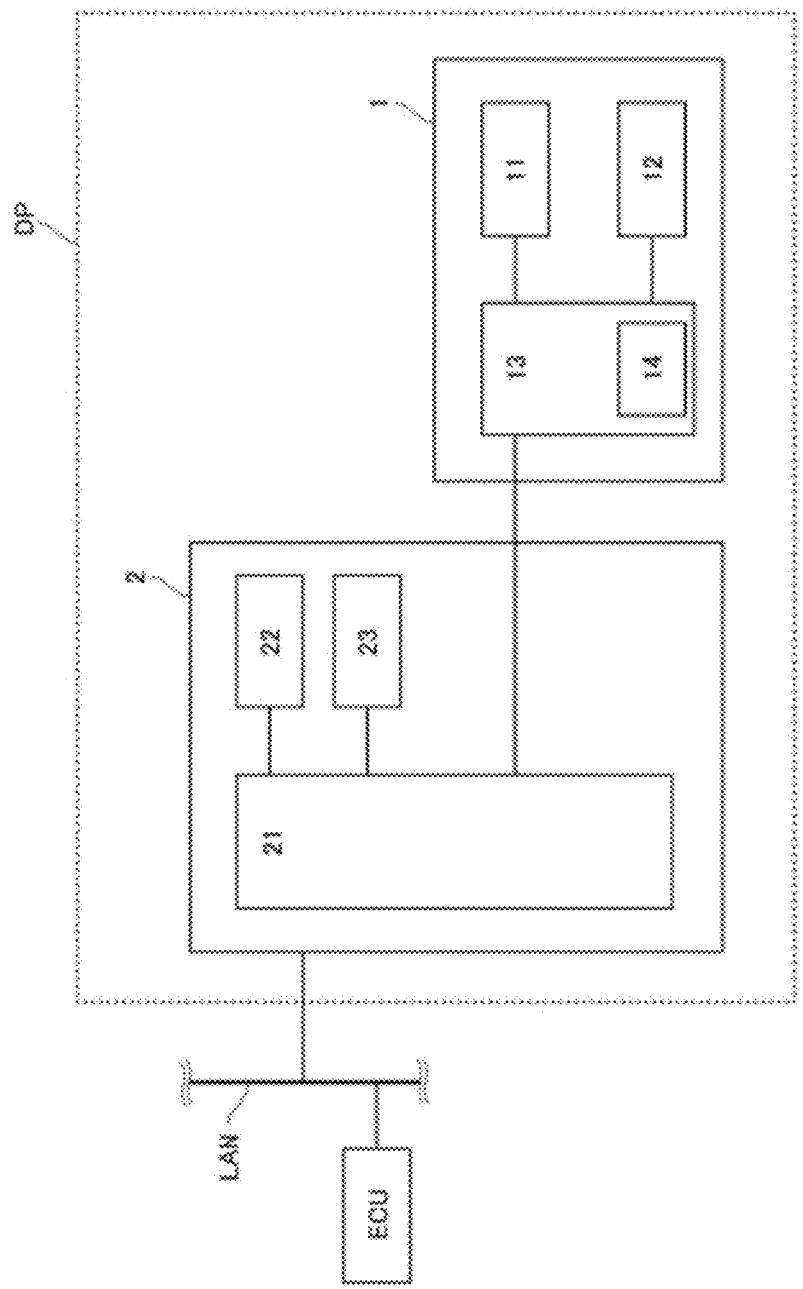
FIG. 3 is a block diagram illustrating a configuration of the vehicular display device.

As illustrated in FIG. 3, the vehicular display device DP obtains the operating state of the automatic parking function of the vehicle V from a vehicle control controller ECU via an in-vehicle network LAN, and displays this operating state. Further, when the touch operation is performed to the automatic parking execution operation button SB displayed on the screen, the vehicular display device DP sends a request to start the operation of the automatic parking function to the vehicle control controller ECU via the in-vehicle network LAN. Having received the request to start the operation of the automatic parking function, the vehicle control controller ECU operates the automatic parking function of the vehicle V.

Next, a configuration example of the vehicular display device DP is described with reference to FIG. 3.

The vehicular display device DP includes a touch panel module 1 and a control unit 2. The touch panel module 1 includes a touch panel 11, a display panel 12, a driver 13, and a storage unit 14 (first storage unit). The driver 13 detects a touch coordinate on the touch panel 11 while displaying display data inputted from the control unit 2 on the display panel 12. The storage unit 14 stores calibration data for the touch panel 11 and the display panel 12. This calibration data is an adjustment parameter set for each touch panel module 1, and includes, for example, a coordinate adjustment parameter, a sensitivity adjustment parameter, and a noise filter adjustment parameter. The coordinate adjustment parameter is used to adjust a relative relationship between a detection coordinate of the touch panel 11 and a display coordinate of the display panel 12. The sensitivity adjustment parameter is used to adjust detection sensitivity of the touch panel 11. The noise filter adjustment parameter is used to adjust a filter to remove a noise component from a detection signal of the touch panel 11.

The control unit 2 includes a CPU 21, a RAM 22, and a ROM 23 (second storage unit). The CPU 21 reads a program (software) and display data stored in the ROM 23 onto the RAM 22, and sequentially executes various processes described in the program. For example, the control unit 2 causes the touch panel module 1 to switch and display the plurality of layout screens Lo1 and Lo2, executes processing according to the touch coordinate inputted from the touch panel module 1, and the like. Further, the ROM 23 stores correct data for the calibration data stored in the storage unit 14 of the touch panel module 1. This correct data is a copy of the calibration data stored in the storage unit 14 of the touch panel module 1 after adjustment of the touch panel module 1 (adjustment of various calibration data) performed at the time of producing the vehicular display device DP.

The control unit 2 includes a fail-safe control means as a functional configuration achieved by cooperation between hardware and software. The fail-safe control means is a functional configuration for detecting a malfunction of the touch panel module 1 when the touch panel module 1 displays a fail-safe control target operation button (e.g., automatic parking execution operation button SB) subjected to fail-safe control among the operation buttons MB1 to MB3 and SB.

In the present embodiment, the automatic parking execution operation button SB is exemplified as the fail-safe control target operation button. However, operation buttons for executing other automatic control modes of the vehicle V can also be included. Example of other automatic control modes include a mode in which the vehicle V automatically controls some or all of vehicle's steering operations and acceleration/deceleration operations, such as an automatic driving function and a cruise control function, in place of an operator of the vehicle V. These operation buttons have a higher risk of causing injury to the operator or passenger in case of malfunction as compared to general operation buttons such as the music playback operation buttons MB1 to MB3 according to a risk classification of Automotive safety integrity level (ASIL), thus the fail-safe control target operation button requires safety measures.

Therefore, the fail-safe control means of the present embodiment prevents that the automatic parking execution operation button SB is erroneously determined to be operated due to a malfunction of the touch panel module 1 without passenger's intention to operate the automatic parking execution operation button SB. Events that the failsafe control means detects as malfunctions of the touch panel module 1 include the following three events.

1) Event in which the calibration data stored in the storage unit 14 of the touch panel module 1 is damaged (hereinafter also referred to as a first event).

2) Event in which a touch operation is erroneously determined due to erroneous detection caused by a water droplet, static electricity, or the like, or a failure of the touch panel module 1 (hereinafter also referred to as a second event).

3) Event in which a fail-safe control target operation switch is not displayed correctly on the display panel 12 due to damage to the display data, a shift in the display position, or the like (hereinafter also referred to as a third event).

Specifically, the failsafe control means executes a first confirmation process regarding the first event after the control unit 2 is activated and before the automatic parking layout screen Lo2 is displayed on the touch panel module 1. The first confirmation process compares the calibration data stored in the storage unit 14 of the touch panel module 1 and the calibration data stored in the ROM 23 of the control unit 2 to confirm whether the calibration data stored in the storage unit 14 is correct (Verify process). According to such a first confirmation process, it is possible to detect damage to the calibration data, which is one of the causes of the malfunction of the touch panel module 1.

If the fail-safe control means determines that the calibration data stored in the storage unit 14 is incorrect, the fail-safe control means rewrites the calibration data stored in the storage unit 14 to the correct calibration data (calibration data stored in the ROM 23). Such rewriting processing can not only prevent the malfunction of the touch panel module 1 due to the damage to the calibration data, but also normalize the operation of the touch panel module 1 with the correct calibration data.

The fail-safe control means execute an erroneous operation determination process regarding the second event after conditions for switching from the music playback layout screen Lo1 to the automatic parking layout screen Lo2 are established and before the touch panel module 1 completes displaying the automatic parking layout screen Lo2. This erroneous operation determination process determines whether a touch operation is performed in an operation detection range of the automatic parking execution operation button SB immediately before the automatic parking layout screen Lo2 is displayed. If the touch operation is determined to be performed, such an operation is determined to be an erroneous operation due to the second event. Such an erroneous operation determination process can prevent the malfunction of the automatic parking function caused by erroneous operation determination of the automatic parking execution operation button SB due to the second event.

The fail-safe control means executes a second confirmation process regarding the third event when the automatic parking layout screen Lo2 is displayed on the touch panel module 1. The second confirmation process determines whether the automatic parking execution operation button SB is displayed correctly. Such a second confirmation process can prevent the malfunction of the automatic parking function caused by the erroneous operation determination of the automatic parking execution operation button SB due to the third event.

Specifically, the fail-safe control means uses a function of Safe display monitor (SDM) to confirm whether a specific memory area has a correct data pattern set in advance. The SDM function calculates in advance an error code value (e.g., Cyclic redundancy check (CRC), Message digest algorithm 5 (MD5), etc.) of the correct data pattern. After calculating the error code for the current specific memory area, the SDM function compares these error detection code values to confirm whether the data in the specific memory area is correct based on matching between these error detection code values.

That is, since the control unit 2 causes the touch panel module 1 to display a predetermined screen by sending screen data stored in a predetermined memory area of the RAM 22 to the touch panel module 1, a specified memory area of the RAM22 is set in advance as the specific memory area for the SDM function, and a screen data pattern for displaying the automatic parking layout screen Lo2 is set in advance as the correct data pattern. Then, before the control unit 2 sends the screen data of the automatic parking layout screen Lo2 to the touch panel module 1 and causes the touch panel module 1 to display the screen data, the SDM function is executed to check the predetermined memory area of the RAM22, thereby confirming whether the automatic parking execution operation button SB is correctly displayed on the touch panel module 1.

Figure 4:
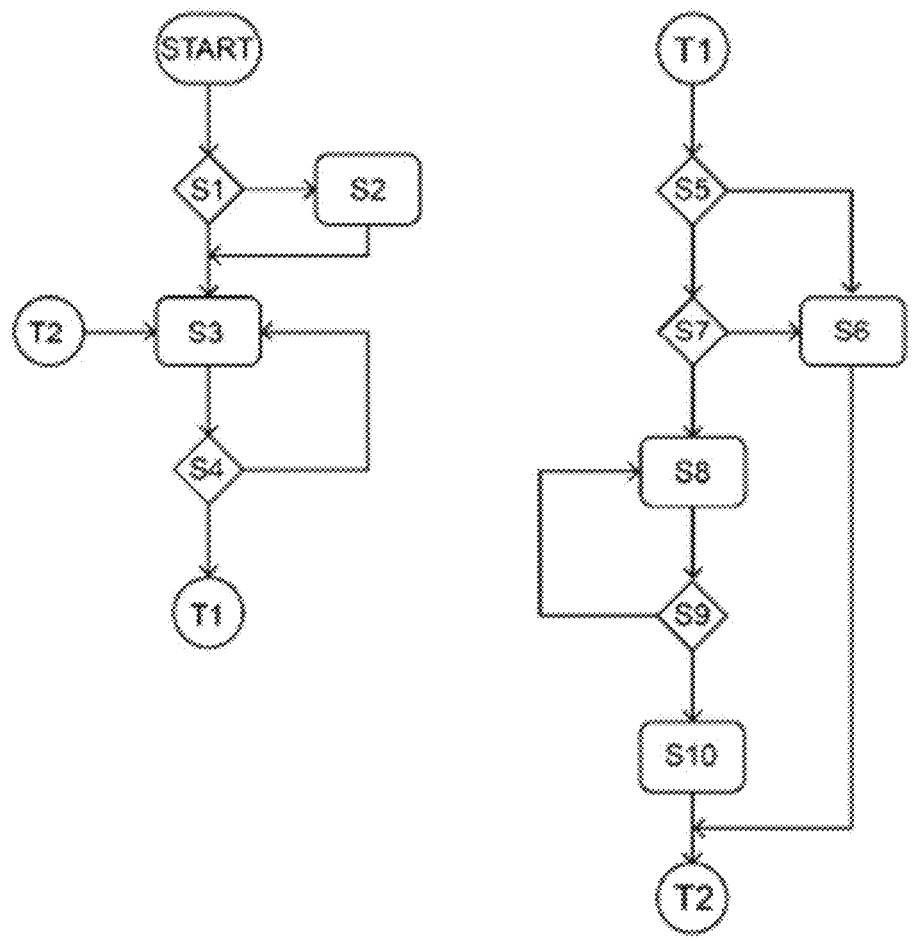
FIG. 4 is a flowchart illustrating a processing procedure of a control unit.

Next, the processing procedure of the control unit 2 that achieves the fail-safe control means described above is described with reference to FIG. 4.

When the control unit 2 is activated in response to activation of a vehicle system (e.g., when a driving operation is started by a vehicle activation switch such as an ignition switch SW), the control unit 2 confirms whether the correct data stored in the ROM 23 and the calibration data stored in the storage unit 14 of the touch panel module 1 coincide with each other (process S1). If the control unit 2 determines that these data do not coincide with each other, the control unit 2 determines that the calibration data in the storage unit 14 is abnormal due to damage or the like, and causes the procedure to proceed to a process S2. If the control unit 2 determines that these data coincide with each other, the control unit 2 causes the procedure to proceed to a process S3.

When the procedure proceeds to the process S2, the control unit 2 overwrites the calibration data stored in the storage unit 14 to the correct data stored in the ROM 23, and then causes the procedure to proceed to the process S3.

When the procedure proceeds to the process S3, the control unit 2 causes the touch panel module 1 to display the music playback layout screen Lo1, and then causes the procedure to proceed to a process S4.

When the procedure proceeds to the process S4, the control unit 2 determines whether the conditions for switching to the automatic parking layout screen Lo2 are satisfied. When the switching conditions are satisfied, the control unit 2 causes the procedure to proceed to a process S5, and when the switching conditions are not satisfied, the control unit 2 causes the procedure to return to the process S3. Note that the conditions for switching to the automatic parking layout screen Lo2 are satisfied, for example, when the vehicle control controller ECU notifies that an operating state of the automatic parking function of the vehicle V is in an executable state (e.g., a state where the vehicle V is stopped, and a parking area where parking is possible is detected in the surrounding area), and an operation of a switching operation button CB (e.g., a switching tab) to the automatic parking layout screen Lo2 displayed on touch panel module 1 is detected.

When the procedure proceeds to the process S5, the control unit 2 determines whether the operation detection range of the automatic parking execution operation button SB is operated before causing the touch panel module 1 to display the automatic parking layout screen Lo2 including the operating state of the automatic parking function and the automatic parking execution operation button SB. If the control unit 2 detects the operation, the control unit 2 determines that the operation is an erroneous operation, and causes the procedure to proceed to a process S6. If the control unit 2 does not detect the operation, the control unit 2 causes the procedure to proceed to a process S7.

Figure 2C:
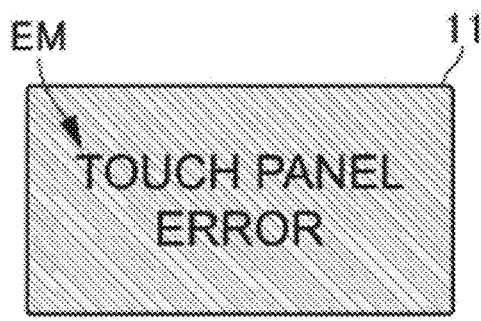

When the procedure proceeds to the process S6, the control unit 2 notifies that the automatic parking function cannot be operated due to an operation error or a display error of the automatic parking execution operation button SB. This notification is performed, for example, by displaying an error message EM (see FIG. 2C) on the touch panel module 1 or by making a sound. After the notification, the control unit 2 causes the procedure to return to the process S3.

When the procedure proceeds to the process S7, the control unit 2 confirms whether the automatic parking execution operation button SB on the automatic parking layout screen Lo2 is displayed correctly. Having determined that the automatic parking execution operation button SB is displayed correctly, the control unit 2 causes the procedure to proceed to the process S6. Having determined that the automatic parking execution operation button SB is not displayed correctly, the control unit 2 causes the procedure to proceed to a process S8.

When the procedure proceeds to the process S8, the control unit 2 causes the touch panel module 1 to display the automatic parking layout screen Lo2, and then causes the procedure to proceed to a process S9. When the procedure proceeds to the process S9, the control unit 2 determines whether a touch operation is performed to the automatic parking execution operation button SB. Having determined that the operation is not performed, the control unit 2 causes the procedure to return to the process S8. Having determined that the operation is performed, the control unit 2 sends an activation signal for the automatic parking function to the vehicle control controller ECU, and causes the procedure to proceed to a process S10. When the procedure proceeds to the process S10, the control unit 2 causes the touch panel module 1 to display the operating state while the automatic parking function is operated. When the operation of the automatic parking function is completed, the control unit 2 causes the procedure to return to the process S3.

Although each example has been described in detail above, the present disclosure is not limited to the specific example, and various modifications and changes can be made within the scope of the claims. It is also possible to combine all or a plurality of the constituent elements of the examples described above.

In the above examples, the example was shown in which the first confirmation process regarding the first event is executed when the vehicle system is activated. However, the present disclosure is not limited to this configuration. For example, the first confirmation process may be always executed immediately before the automatic parking layout screen Lo2 is displayed on the touch panel module 1. In the former case where the first confirmation process is executed when the vehicle system is activated, the confirmation is executed only once during the system activation, while in the latter case, the confirmation is executed every time the automatic parking layout screen Lo2 is displayed. This makes the system more durable.

DESCRIPTION OF REFERENCE NUMERALS

V: Vehicle
DB: Dashboard
DP: Vehicular display device
1: Touch panel module
11: Touch panel
12: Display panel
13: Driver
14: Storage unit (first storage unit)
2: Control unit
21: CPU
22: RAM
23: ROM (second storage unit)
SB: Automatic parking execution operation button (fail-safe control target operation button)
MB1 to MB3: Music playback operation button
CB: Switching operation button
EM: Error message
Lo1: Music playback layout screen (first layout screen)
Lo2: Automatic parking layout screen (second layout screen)

The invention claimed is:

1. A vehicular display device comprising:
   a touch panel that detects a touch coordinate on a display screen; and
   a controller that causes the touch panel to switch and display a plurality of layout screens including an operation button and causes the touch coordinate to be inputted from the touch panel, wherein:
   the touch panel includes a first storage that stores calibration data, which is an adjustment parameter for detecting the touch coordinate;
   the controller includes a second storage that stores correct calibration data, and is further configured to detect a malfunction of the touch panel;
   the plurality of layout screens includes:
      a first layout screen that does not include a fail-safe control target operation button, which is a malfunction detection target of the controller; and
      a second layout screen that includes the fail-safe control target operation button;
   after the controller is activated and before the second layout screen is displayed on the touch panel, the controller compares the calibration data stored in the first storage and the calibration data stored in the second storage, thereby executing a first confirmation process to confirm whether the calibration data stored in the first storage is correct; and
   when the controller determines that the calibration data stored in the first storage is incorrect, the controller rewrites the calibration data stored in the first storage to the correct calibration data.

2. The vehicular display device according to claim 1, wherein the fail-safe control target operation button is an operation button for executing a vehicle automatic control mode.

3. The vehicular display device according to claim 1, wherein, after conditions for switching from the first layout screen to the second layout screen are satisfied and before the touch panel completes displaying the second layout screen, when the controller detects a touch operation in an operation detection range of the fail-safe control target operation button, the controller determines that an erroneous operation of the fail-safe control target operation button occurs.

4. The vehicular display device according to claim 1, wherein the controller executes a second confirmation process to confirm whether the fail-safe control target operation button is displayed correctly when the second layout screen is displayed on the touch panel.

* * * * *